United States Patent [19]

Harwood et al.

[11] Patent Number: 4,634,984

[45] Date of Patent: Jan. 6, 1987

[54] DURATION-SENSITIVE DIGITAL SIGNAL GATE

[75] Inventors: Leopold A. Harwood, Bridgewater; Kirk A. Law, East Windsor, both of N.J.

[73] Assignee: RCA Corporation, Princeton, N.J.

[21] Appl. No.: 724,646

[22] Filed: Apr. 18, 1985

[51] Int. Cl.$^4$ ........................................... H03K 5/153
[52] U.S. Cl. ..................................... 328/112; 328/58; 307/234; 307/267; 307/470; 307/602
[58] Field of Search ............... 302/602, 265, 267, 234, 302/470; 328/111, 112, 58

[56] References Cited

U.S. PATENT DOCUMENTS

| | | | |
|---|---|---|---|
| 3,379,981 | 4/1968 | Humpherys | 328/112 |
| 3,614,632 | 10/1971 | Leibowitz et al. | 328/58 |
| 3,667,054 | 5/1972 | Nelson | 307/234 |
| 4,061,975 | 12/1977 | Sugai | 328/112 |
| 4,200,810 | 4/1980 | Cain et al. | 328/58 |
| 4,214,270 | 7/1980 | Murito | 307/234 |
| 4,233,525 | 11/1980 | Takahashi et al. | 328/112 |

Primary Examiner—John S. Heyman
Attorney, Agent, or Firm—Eugene M. Whitacre; Paul J. Rasmussen; William H. Meagher

[57] ABSTRACT

One-bit stream of clocked control information is applied to the input of delay means, having a succession of signal takeoff points, with the delay between successive takeoff points being the same (e.g., twice a period at the clocking frequency, $f_{CL}$). Each takeoff point is linked to a respectively different input of an "and" gate. The "and" gate output is coupled to one input of a succession of two-input "or" gates, with the other input of each of said "or" gates coupled to the output of an associated one of a plurality of delay devices, each of the latter imparting the same delay (e.g., corresponding to a period of $f_{CL}$). The output of the last of the succession of "or" gates is coupled to a control signal output terminal. The output of each of the remainder of the succession is coupled to the other input of the next succeeding "or" gate in the succession. The input of the delay device associated with the first "or" gate of the succession is coupled to receive the output of an additional two-input "or" gate. One input of the additional "or" gate is responsive to the output of the "and" gate, while the other input thereof is not signal-responsive, being maintained at a "0" level.

5 Claims, 1 Drawing Figure

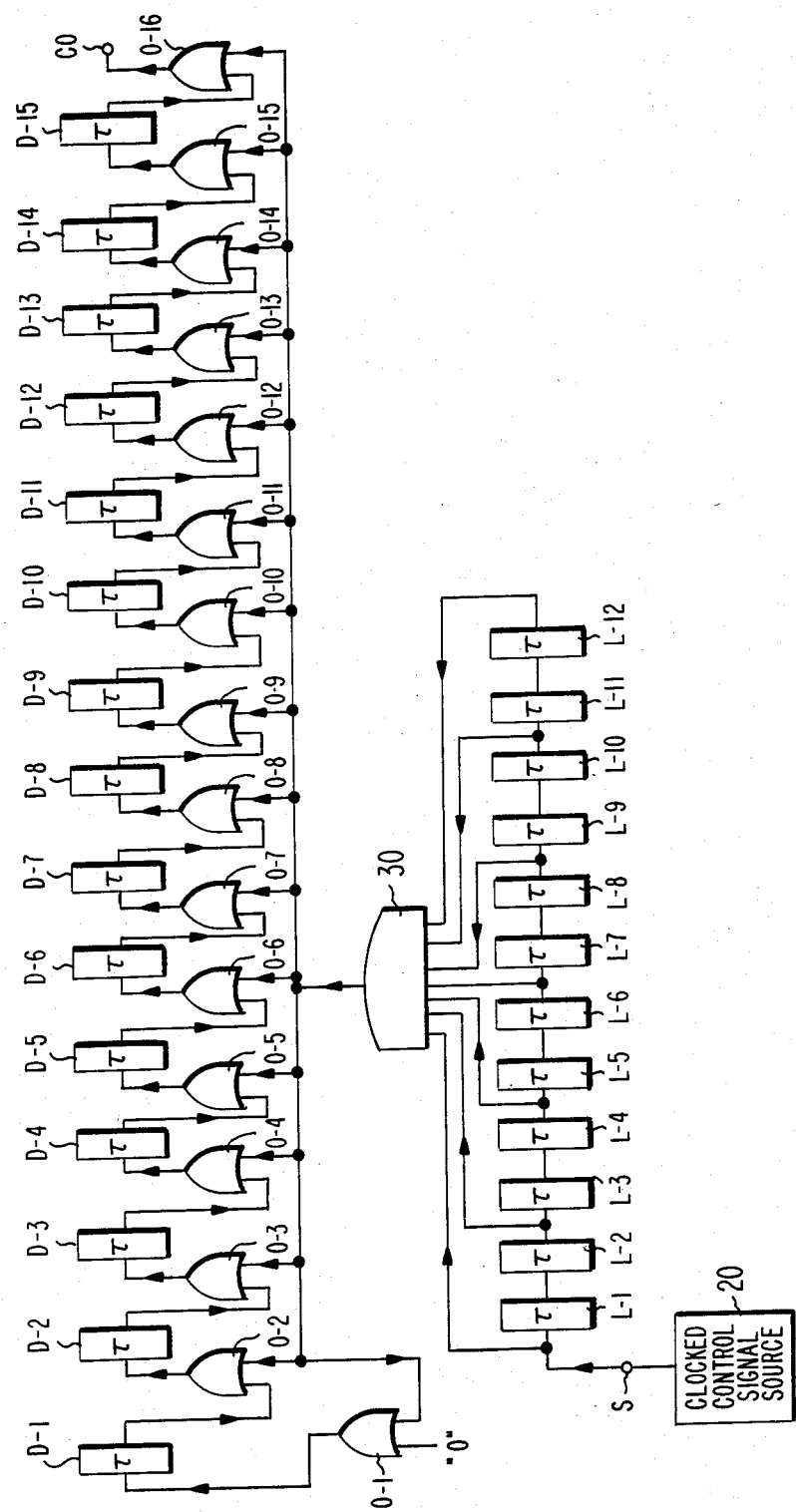

DURATION-SENSITIVE DIGITAL SIGNAL GATE

The present invention relates generally to digital signal processing circuits, and particularly to a novel signal gate for a digital signal, wherein performance of the gating function is rendered sensitive to the duration of predetermined signal conditions in the digital signal to be gated.

In a copending U.S. patent application Ser. No. 724,555 of L. A. Harwood, et al., entitled "Digital Correlation Indicator and Hanging Dot Reduction System Employing Same" and concurrently filed herewith, there is disclosed a system for effecting reduction of picture disturbances of the so-called "hanging dot" type that may be associated with employment of a comb filter for separation of the luminance and chrominance components of composite video signals in a color television receiver.

The success of the separation function performed by typical forms of comb filters in color television receivers is dependent upon the existence of redundancy of picture information in adjacent regions of successive scan lines. For picture areas where a transition in the direction of field scanning (hereinafter referred to as a vertical transition) occurs, the difference in picture information in adjacent regions of successive scan lines can result in imperfect performance of the separation function, with one consequence being the appearance of a chrominance component in the luminance signal output of the comb filter. If not removed, the interloping chrominance component will be reproduced as "hanging dots", i.e., as an undesirable array of dots extending across the region of the vertical transition in the display picture.

In the hanging dot reduction system of the aforesaid copending U.S. patent application, certain signal relationships, found to be pertinent to recognition of the presence of an interloping chrominance component in the combed luminance signal output of a receiver's comb filter, are monitored by clocked sensing circuits developing a one-bit stream of information at an output terminal. The existence of one of said signal relationships is manifested during a given clocking interval by elevation of the output terminal to an active "1" level from a quiescent "0" level.

The likelihood that a hanging dot incident is actually occurring is increased if elevations of the output terminal to the active "1" level recur in a repeating pattern for a period of time exceeding a predetermined plurality of clocking intervals. This is so, because any appearance of an interloping chrominance component in the luminance signal output of the comb filter will have at least a minimum duration exceeding some predetermined plurality of clocking intervals, due to the known, limited bandwidth of the chrominance component.

In the aforementioned system, the pattern of recurrence of "1" level attainment at the sensing circuit output terminal can differ depending on the nature of the vertical transition causing the hanging dot incident. For certain types of vertical transitions, the pattern is such that the "1" level is attained only during alternate ones of the clocking intervals, whereas, for other types of vertical transitions, a continuous stream of successive "1" level appearances is produced.

For enhancement of the reliability of the aforementioned hanging dot reduction system, it is recognized in said copending patent application that use of control information developed at the sensing circuit output terminal for actuation of a hanging dot eliminator (e.g., operating to bar high frequency components from the receiver's luminance channel) should occur only if the control information meets the above-discussed minimum-duration criterion. To this end, it is desirable to interpose, between sensing circuit output terminal and hanging dot eliminator, a signal gate with a gating function which is sensitive to the duration of predetermined signal conditions in the control information to be passed or blocked.

The present invention is concerned with a duration-sensitive signal gate which may serve, for example, the above-described gating function, enabling actuation of a hanging dot eliminator only when the control information meets an appropriate minimum-duration criterion.

In accordance with the principles of the present invention, an advantageous duration-sensitive signal gate, suitable for such gating purposes as exemplified above, comprises: delay means having a plurality of successive signal takeoff points; an "and" gate having a plurality of inputs; a plurality of signal paths, equal in number to said plurality of inputs, with each signal path linking a respectively different one of said takeoff points to a respectively different one of said inputs; a plurality of delay devices; and a succession of two-input "or" gates, each associated with a respectively different one of said delay devices. The input of the delay means is responsive to clocked signals alternatively exhibiting a "1" or a "0" level, and the amount of delay between successive of said take off points is the same. Each of said plurality of delay devices imparts the same predetermined amount of delay. One input of each of said succession of "or" gates is responsive to the output of the "and" gate, while the other input of each of said succession is coupled to the output of the associated one of said plurality of delay devices.

A duration-sensitive signal gate pursuant to the present invention further includes: means for supplying the output of the last of said succession of "or" gates to an output terminal; means for delivering the output of each of the remainder of said succession of "or" gates to the input of the delay device associated with the next succeeding one of said succession; and means for rendering the input of the delay device associated with the first of said succession of "or" gates responsive only to the output of said "and" gate.

In accordance with an illustrative embodiment of the present invention, the aforementioned rendering means desirably comprises an additional two-input "or" gate having its output coupled to the input of said delay device associated with the first of said succession of "or" gates, having one input rendered responsive to the output of said "and" gate, and having its other input maintained at a "0" level.

In an illustrative application of the present invention to the hanging dot reduction purposes of the previously mentioned copending U.S. patent application, the amount of delay between successive ones of said takeoff points is desirably equal to twice a period at the clocking frequency for the signal processing system, while said predetermined amount of delay imparted by each of said plurality of delay devices is equal to a period at said clocking frequency.

To obtain control period stretching effects, if desired, pursuant to the principles of the invention described in a copending U.S. patent application Ser. No. 724,644 of R. A. Wargo, entitled "Duration-Sensitive Digital Signal Stretcher" and concurrently filed herewith, the sum of the delays imparted by said plurality of delay devices conveniently may be chosen to exceed the amount of delay between the first and the last of said successive signal takeoff points.

In the sole FIGURE of the accompanying drawing, a duration-sensitive gate for clocked signals, pursuant to an embodiment of the present invention, is schematically illustrated.

In the system of the drawing, the output of a clocked control signal source 20 appears at terminal S as a one-bit stream of control information, exhibiting either a quiescent "0" level or an active "1" level during each successive clocking interval. The signal at terminal S is applied to the input of a series of twelve similar delay devices (L-1,L-2, ... L-12) connected in cascade. Illustratively, each of these delay devices comprises a latch imparting a signal delay ($\tau$) corresponding to a period at the signal clocking frequency ($f_{CL}$).

The cascade connection of the delay devices (L-1,L-2, ... L-12) forms a delay means which exhibits a delay of a $2\tau$ amount between succeeding ones of a plurality of signal takeoff points (located successively at the respective inputs of delay devices L-1,L-3,L-5,L-7,L-9, and L-11, and the output of delay device L-12). An "and" gate 30 is provided with seven inputs, each linked by a signal path to a respectively different one of the aforementioned signal takeoff points.

The output of "and" gate 30 is coupled to one input of each of a succession of fifteen two-input "or" gates (0-2,0-3 ... 0-16), with the other input of each of said "or" gates coupled to the output of an associated one of a plurality of similar delay devices (D-1,D-2, ... D-15). Illustratively, each of these delay devices also comprises a latch imparting a signal delay ($\tau$) corresponding to a period at the signal clocking frequency ($f_{CL}$). The output of the last "or" gate (0-16) of the succession is coupled to a control signal output terminal CO. The output of each of the remainder of this succession of "or" gates is coupled to the other input of the next succeeding "or" gate in the succession.

The illustrated structure is completed by an additional "or" gate (0-1) disposed with its output connected to the input of the delay device (D-1) associated with the first (0-2) of the aforementioned succession of "or" gates. One input of "or" gate 0-1 is coupled to receive the output of "and" gate 30, while the other input of gate 0-1 is maintained at the quiescent "0" level.

It will be appreciated that, in the system of the drawing, the structure interposed between control signal source terminal S and control signal output terminal CO serves a duration-sensitive signal gating function, passing control information which satisfies a duration criterion, but blocking information which fails to satisfy such a criterion. In the specific arrangement shown, the criterion is that exhibition of a "1" level at terminal S in at least seven successive alternate clocking intervals must occur in order for a departure from the quiescent "0" level to be permitted at the control signal output terminal CO. When such an event occurs, a "1" level appears at the output terminal CO, as well as appearing at the input of each of the delay devices D-1, D-2, etc. Thereafter, the "1" level is sustained at terminal CO for an output control period encompassing a plurality of successive clocking intervals.

The duration of the output control period will, of course, be directly influenced by the duration of the period over which the input signal at terminal S is able to satisfy the duration criterion (seven successive alternate samples at a "1" level). However, the illustrated arrangement permits a stretching of the output control period duration relative to the duration of period over which the input signal provides the aforementioned criterion satisfaction. This result is established by selecting the sum of the delays provided by delay devices D-1, D-2, etc. to exceed the delay provided between the first and last of the signal takeoff points of the delay means L-1, L-2, etc., as explained in the aforementioned copending Wargo patent application.

The illustrated use of a duration criterion which is tested by monitoring alternate samples (via use of the 2 t delays between the successive signal takeoff points) is particularly appropriate for use in the hanging dot reduction system of the aforementioned copending Harwood, et al. application, as explained more fully therein. In other applications of the present invention, however, the monitoring of immediately succeeding samples, for example, may be appropriate instead. In such an instance, the inputs of "and" gate 30 will be linked to successive signal takeoff points seperated by a delay equal to a period at the clocking frequency.

It will be appreciated that choice of the number of inputs to be provided for "and" gate 30 may differ, depending upon utilization system requirements. Similarly, the number of delay devices D-1, D-2, etc., and the relationship of their delay sum to the total delay of the cascaded devices L-1, L-2, etc., are selectable parameters that may be tailored to particular system requirements.

What is claimed is:

1. A duration-sensitive signal gate for use with a clocked source of signals alternatively exhibiting a "1" or a "0" level, comprising:

delay means having a plurality of successive signal takeoff points; the amount of delay between successive ones of said takeoff points being the same; the input of said delay means being responsive to the output of said signal source;

a plurality of signal paths, each connected to a respectively different one of said signal takeoff points;

an "and" gate having a plurality of inputs equal in number to said plurality of signal paths, each of said signal paths terminating at a respectively different one of said plurality of inputs of said "and" gate;

a plurality of delay devices, each imparting the same predetermined amount of delay; and a succession of two-input "or" gates, each associated with a respectively different one of said plurality of delay devices, with one input of each of said succession rendered responsive to the output of said "and" gate, and with the other input of each of said succession coupled to the output of the associated one of said plurality of delay devices;

means for supplying the output of the last of said succession of "or" gates to an output terminal;

means for delivering the output of each of the remainder of said succession of "or" gates to the input of the delay device associated with the next succeeding one of said succession; and means for rendering the input of the delay device associated with the first of said succession of "or" gates responsive only to the output of said "and" gate.

2. Apparatus in accordance with claim 1, wherein said rendering means comprises an additional two-input "or" gate having its output coupled to the input of said delay device associated with the first of said succession of "or" gates, having one input rendered responsive to the output of said "and" gate, and having its other input maintained at a "0" level.

3. Apparatus in accordance with claim 2 wherein the sum of the delays imparted by said plurality of delay devices exceeds the amount of delay between the first and last of said succession of signal takeoff points.

4. Apparatus in accordance with claim 3 wherein the amount of delay between sucessive ones of said takeoff points is equal to twice a period at the clocking frequency for said signals.

5. Apparatus in accordance with claim 4 wherein said predetermined amount of delay imparted by each of said plurality of delay devices is equal to a period at the clocking frequency for said signals.

* * * * *